Sept. 18, 1945.   R. K. HOKE   2,385,000
SHAFT PROTECTOR
Filed April 11, 1944
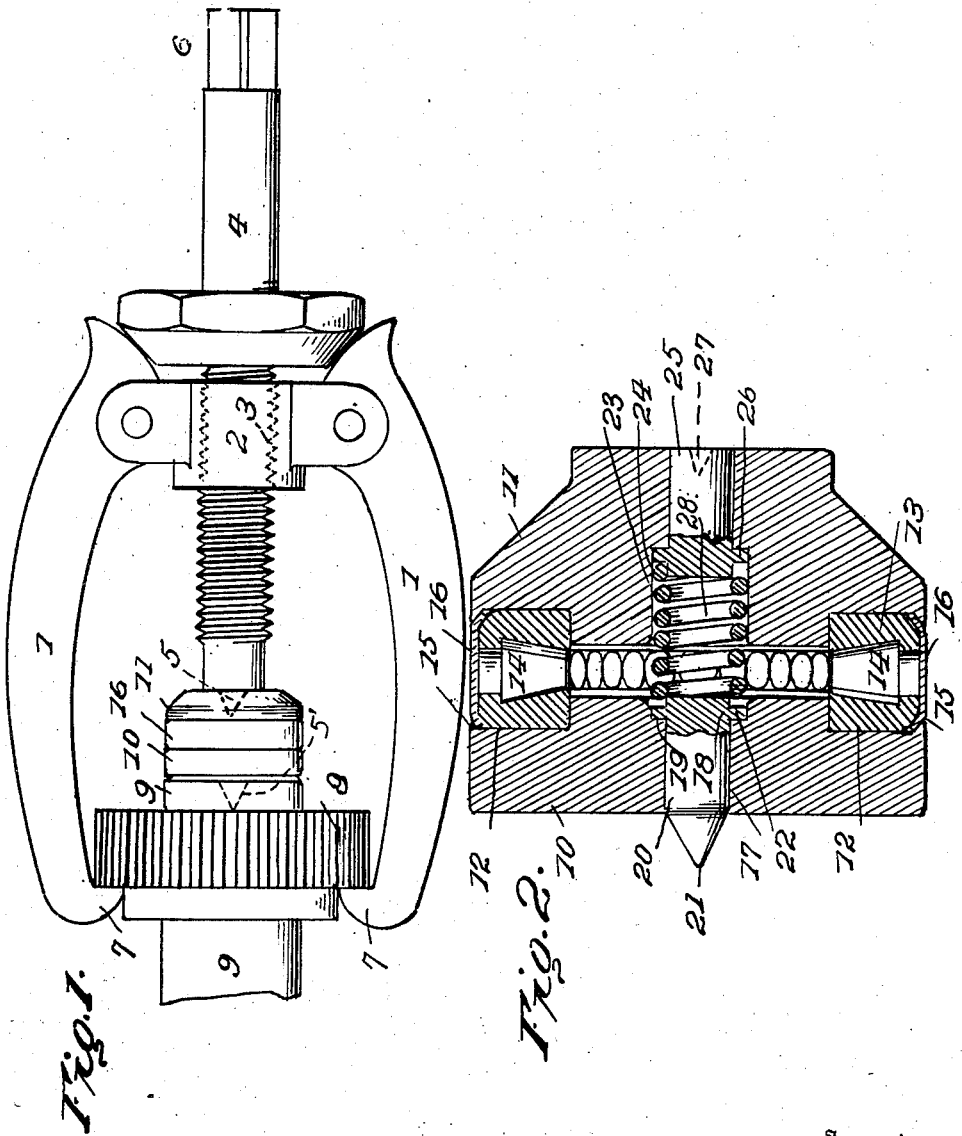
Inventor
Roland K. Hoke
By J. T. Dowling
Attorney Patented Sept. 18, 1945

2,385,000

UNITED STATES PATENT OFFICE 2,385,000

SHAFT PROTECTOR

Roland K. Hoke, Baltimore, Md.

Application April 11, 1944, Serial No. 530,487

7 Claims. (Cl. 29—261)

This invention is directed to a thrust unit for use in connection with puller assemblies of the wheel puller or other type, with such unit serving to avoid wear or distortion on the fixed element operated on by the puller, and to very materially reduce the frictional resistance between the operating parts in the use of the puller assembly.

The primary object of the present invention is to introduce into the conventional or other form of puller assembly a thrust unit to be interposed between the fixed element of the parts operated on by the puller assembly and the manually operable pressure bar of the puller assembly, with such unit having in part broad and relatively fixed contact with the fixed member of the parts operated on, and in part relatively fixed contact with the pressure rod of the puller assembly and including a thrust bearing between such parts of the unit, whereby the thrust rod in rotative movement to provide the puller function operates through the thrust bearing to transfer the power through that part of the thrust unit which is in relatively fixed relation to the fixed element of the parts operated on.

A further object of the invention is the provision of a thrust unit of the type described involving plugs separated by a thrust bearing and relatively rotatable, with one of the plugs having a relatively movable element for center cooperation with the fixed element of the parts being operated upon, and the other of the plugs having a relatively movable element to center and receive the end of the thrust rod, with both plugs forming broad contact surfaces in cooperation with the respective elements to distribute the load.

A further object of the invention is the provision of means for insuring a spring-loaded yield of the movable elements in the thrust plugs to accommodate variation in the centers of the parts of the puller assembly with which the thrust plugs cooperate.

A further object of the invention is the provision of a roller thrust bearing between the plugs, externally sealed against leakage to permit the interior thereof to remain charged with appropriate lubrication to materially reduce frictional resistance in the operation of the puller assembly.

The invention is illustrated in the accompanying drawing, in which:

Figure 1 is a plan view illustrating the application of a conventional pinion puller with the improved thrust element in place.

Figure 2 is an enlarged vertical sectional view, partly in elevation, of the improved thrust unit.

In the particular type of puller assembly illustrated, and to which of course the invention is in nowise limited, such assembly includes hooks 1 pivotally connected at one end to a hub 2 formed with an internal threaded bore 3 to receive a thrust rod 4 threaded for cooperation with the bore of the hub and formed at one end with a center 5 and at the opposite end, as at 6, to receive an appropriate tool by which the thrust rod may be turned. The ends of the hooks 1 remote from the hub have the usual terminal offset 7 to engage in rear, in the instance shown, of the pinion 8.

In the conventional use of such a puller, the hooks are positioned as illustrated in Figure 1, and the rod 4 is threaded through the bore until the center 5 engages an opening 5' in the end of the shaft 9 from which the pinion is to be removed. On further operation of the rod, naturally increased as the load of moving the pinion resists the separation, relative thrust in opposite directions on the shaft 9 and pinion 8 results eventually in the removal of the latter from the shaft. This operation, necessarily including a relative rotative movement of the thrust rod against the shaft, tends to a distortion or damage to the end of the shaft and a frequent somewhat later distortion of the center 5. If the labor of removing the pinion compels a relatively high increased force to turn the thrust rod, the friction incident to the resistance becomes a very material factor in the difficulty of the removal, and obviously this resistance increases as the load increases.

It is the purpose of the present thrust unit to avoid this wear and distortion on the shaft 9 and to maintain at a minimum the frictional resistance incident to any required operation of the thrust rod.

To secure this result, the improved thrust unit includes spaced thrust plugs 10 and 11 disposed in alignment and each recessed at 12 on their proximate faces near their peripheral edges to receive races 13 of a roller or other bearing 14. The races 13 fit more or less snugly within the recesses 12, with the races of a length however to leave an unoccupied margin 15 at the outer end of each recess. An unbroken steel plate 16, which of course may be of any appropriate material, is fitted into this unoccupied margin 15 of the recesses 12 to completely seal the thrust bearing against leakage.

The plug 10 is formed with an axial bore 17, which at the bearing face of the plug is diametrically enlarged at 18 to provide an abrupt shoulder 19 surrounding the bore 17. A center pin 20 is slidably fitted in the bore 17 and formed at one end with a conical point 21. The center pin has an annular projection 22 designed to fit in the bore enlargement 18 and bear against the shoulder 19 when the pin is in position to project the conical point the conventional distance beyond the opposite face of the plug 10. The plug 11 is formed with a bore 23 in axial alignment with the bore 17, which bore is diametrically enlarged to approximately one-half its length at 24, for a purpose to be later referred to.

A centering pin 25 is slidably mounted in the bore 23 and formed at the end toward the thrust bearing, with an annular projection 26 to bear against the shoulder formed by the enlargement 24 of the bore 23, thus limiting movement of the centering pin 25 in a direction from the thrust bearing. The end of the centering pin remote from the thrust bearing is axially formed with an appropriate center recess 27 to receive the center 5 of the thrust rod. A coil spring 28 is housed in the enlargement 24 of bore 23 and bearing at one end against the center pin 20 and at the opposite end against the centering pin 25.

As previously described, the thrust roller bearing is sealed against leakage to the exterior thereof, and therefore it is contemplated as a material part of the present invention that the space between the proximate faces of the plugs 10 and 11 and inwardly of the bearing proper may be filled with grease or like lubricant.

In use, the thrust unit is interposed between the shaft 9 in the instance shown, and the operative end of the thrust rod, the conical end 21 of the center pin 20 fitting in the formed center opening of the shaft and the center 5 of the thrust rod 4 fitting in the center recess 27 of the centering pin 25. Of course, in the initial turning of the thrust rod to hold the thrust unit in contact with the end of the shaft, the broad outer face of the thrust plug 10 will bear directly against the end of the shaft 9. If the center opening in the shaft is insufficient to fully receive the conical point 21, the center pin 20 will yield against the pressure of the spring until the broad face of the plug 10 is in direct axial contact with the end of the shaft. In the pressure movement of the thrust rod 4, the center 5 of that rod is fitted into the recess 27 of the centering pin 25, the latter yielding if necessary until the broad proximate face of the plug 11 bears against the proximate face of the end of the thrust rod. With the hooks 7 engaged behind the pinion, the thrust rod is operated to thread it through the hub 2 and compel relatively opposite movements of the pinion and shaft. In this operation, the thrust rod of course is being turned, and as it is in contact with the face of the plug 11, the latter is also turning. However, this turning movement of the plug 11 is not transmitted to the plug 10, but both the relative turning movement and the thrust are transmitted through and by the interposed roller bearing under constant and appropriate lubrication to the plug 10. This plug 10, however, being in contact with the fixed shaft 9, does not partake of the rotation but exerts a direct pressure on the end of the shaft without any relative movement between that shaft and the element of the puller assembly transmitting the pressure. Of course, continued movement of the thrust rod is necessary until the pulley is loosened on the shaft and thereafter easily removable, but no matter what the power required to operate the thrust rod may be, the friction incident to the turning of the thrust rod under that power is practically completely absorbed by the roller bearing.

Theerfore, there is no mutilation of the end of the shaft 9, there is substantially no friction or at least no increased friction incident to the operation of the thrust rod no matter what power may be required to remove that rod, and hence the puller assembly becomes an effective implement which will entirely avoid any distortion or mutilation of the end of the shaft, and which will materially simplify the effort required to operate the assembly incident to the reduction in the frictional component of that operation.

What I claim is:

1. A puller assembly thrust unit including spaced thrust plugs, an anti-friction thrust bearing between the plugs, a center pin movable in one plug, a centering pin movable in the other plug, and means operating through the thrust plugs and interposed thrust bearing to create the necessary removal pressure of the unit.

2. A thrust unit including spaced plugs, an interposed anti-friction bearing between the plugs, a center pin movable in one plug, a centering pin movable in the other plug, and a spring interposed between and creating opposing pressures on the center pin and the centering pin.

3. A construction as defined in claim 2, wherein each plug has a broad bearing face providing opposed surfaces to take a thrust reaction.

4. A construction as defined in claim 2, wherein the anti-friction bearing is sealed against external leakage to provide within the bearing a lubricant space.

5. A construction as defined in claim 2, wherein races of the anti-friction bearing are seated in recesses in the proximate faces of the plugs.

6. A construction as defined in claim 2, wherein the center pin is mounted in an axial bore in one plug, with the bore formed with a shoulder and the center pin formed with an annular enlargement to engage said shoulder to move the pin in one direction relative to the plug.

7. A construction as defined in claim 2, wherein the plug receiving the centering pin is formed with a bore in which said pin is slidable, with the bore enlarged to house the spring element between the center and centering pins.

ROLAND K. HOKE.